(12) United States Patent
Ando et al.

(10) Patent No.: US 6,230,098 B1
(45) Date of Patent: May 8, 2001

(54) MAP DATA PROCESSING APPARATUS AND METHOD, AND MAP DATA PROCESSING SYSTEM

(75) Inventors: Kouichi Ando, Susono; Toru Ito, Nagoya, both of (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 09/144,262

(22) Filed: Aug. 31, 1998

(30) Foreign Application Priority Data

Sep. 17, 1997 (JP) .................................................. 9-251571

(51) Int. Cl.⁷ .................................................. G01C 21/00
(52) U.S. Cl. .......................... 701/208; 701/211; 340/990; 340/995
(58) Field of Search .................................. 701/208, 212, 701/211, 210; 340/995, 990

(56) References Cited

U.S. PATENT DOCUMENTS

| | | | |
|---|---|---|---|
| 4,951,212 | | 8/1990 | Kurihara et al. . |
| 5,406,493 | * | 4/1995 | Goto et al. ............................ 701/208 |
| 5,469,360 | * | 11/1995 | Ihara et al. ............................ 701/208 |
| 5,729,731 | * | 3/1998 | Yajima et al. ............................ 707/3 |
| 5,731,978 | * | 3/1998 | Tamai et al. ........................ 701/201 |
| 5,951,620 | * | 9/1999 | Ahrens et al. ........................ 701/200 |
| 6,075,467 | * | 6/2000 | Ninagawa ............................ 340/995 |

FOREIGN PATENT DOCUMENTS

| | | |
|---|---|---|
| 41 11 147 A1 | 10/1992 | (DE) . |
| 195 44 382 A1 | 5/1997 | (DE) . |
| 07261661 | 10/1995 | (JP) . |

\* cited by examiner

Primary Examiner—William A. Cuchlinski, Jr.
Assistant Examiner—Olga Hernandez
(74) Attorney, Agent, or Firm—Finnegan, Henderson, Farabow, Garrett & Dunner, L.L.P.

(57) ABSTRACT

On a vehicle side, map data storage section stores map data, which is to be updated by using the latest map data transmitted from an information center. The map data includes map data of a number of types, such as landmark information, drawing data, route calculation data. For drawing data and route calculation data, the information center sends differential data indicative of difference between the latest data held by the center and the map data held by the vehicle. The differential data of the drawing data is stored separately from extant data in the storage section by generating processing section. The differential data of the route calculation data is combined with extant data by restructure processing section to thereby restructure route calculation data. On the other hand, for landmark data, the center transmits full data, which is data corresponding to the entire latest map data, rather than only the difference. The full data is used to overwrite the extant data. As described above, an appropriate update process is performed according to the type of map data.

14 Claims, 9 Drawing Sheets

EXAMPLE OF MAP D/B UPDATING

MAP D/B INSIDE STRUCTURE

EXAMPLE OF MAP D/B UPDATING

EXAMPLE OF DIFFERENTIAL DATA TRANSMISSION

EXAMPLE OF ROUTE CALCULATION DATA RESTRUCTURE

INTER-NODE CONNECTION DATA IS AVAILABLE AS ROUTE CALCULATION DATA

NEWLY BUILT ONE WAY ROAD 5 → 4

TRANSMIT DIFFERENTIAL DATA 5 → 4

DATA ON NEWLY BUILD ROAD (DIFFERENTIAL DATA : 5 → 4) IS ADDED TO ROUTE CALCULATION DATA

MANAGEMENT FILE STRUCTURE

MANAGEMENT FILE MANAGES START ADDRESS OF RESPECTIVE FILES AS FOLLOWS:

| DRAWING DATA | 0x00003000 |
|---|---|
| ROUTE CALCULATION DATA | 0x00008000 |
| LANDMARK INFORMATION | 0x0000c000 |
| NAME DATA | 0x0000f000 |
| DRAWING DIFFERENTIAL DATA 1 | 0x00030000 |
| DRAWING DIFFERENTIAL DATA 2 | 0x00041249 |
| TEMPORARY WRITING DATA | 0x00051211 |

START ADDRESS

Fig. 9

MAP DATA PROCESSING APPARATUS AND METHOD, AND MAP DATA PROCESSING SYSTEM

BACKGROUND OF THE INVENTION

1. Field of the Invention

The present invention relates to a map data processing apparatus and method for updating map data stored in a map data storing means using the latest map data. The present invention also relates to a map data processing system including the map data processing apparatus.

2. Description of the Related Art

Electronic apparatuses using map data are well known. A typical example of such an apparatus is a vehicle-use navigation system. In a conventional navigation apparatus, map data is stored in a storage medium, such as a CD-ROM, and the entire storage medium is generally exchanged for a new one in order to update the map data stored therein when the use of newer map data is required for accurate navigation.

Meanwhile, a vehicle information system proposal has attracted attention as part of what is known as ITS (Intelligent Transport Systems). In this vehicle information system, various useful information is supplied from an information center to a vehicle via data communication. The offer of the latest map data via communication is also proposed with an expectation such that it may facilitate map data updating.

Japanese Patent Laid-open No. Hei 8-305282 discloses an example of a system in which map data is updated using communication. In this system, an information system has the latest map data, and data communication is carried out between the information center and an on-vehicle navigation apparatus. In the navigation apparatus, map data is stored so as to be read/written in a storing means. For updating the map data stored on the vehicle side, whether or not the stored map data is the latest is determined based on the detected version number. If the data is not the latest version, the latest map data is transmitted from the information center.

The above JP laid-open No. Hei 8-305282 also discloses transmission of differential data from an information center to a vehicle to achieve map data updating in a shorter time. Differential data is data indicative of difference between the latest map data held by the center and older map data held by a vehicle. As differential data has a significantly smaller volume compared to the whole of original map data, it can be transmitted in a shorter time.

In map data updating, it is desirable that processing be completed within the shortest time as possible. Utilizing the above mentioned differential data is one of effective means to increase the update-processing speed. Further, in an updating process, it is important to ensure ease with which updated map data is used in a navigation-related process. That is, it is desirable that an updating process does not result in complicating a process using map data. It is expected that an updating process can be optimized by achieving high-speed update-processing while ensuring ease in using updated map data.

However, at the present stage, map data transmission to a vehicle via communication is still being studied, and none of the conventional technologies takes into consideration compatibility between high-speed update-processing and ease in using updated map data. Therefore, it has been difficult to carry out truly efficient map data updating.

In particular, map data used in a navigation apparatus consists of map data in a number of types. In other words, such total map data is a collection of map data of a number of types. Various map data, such as map data for drawing, for route calculation, and for map matching, may often have different purposes and uses.

In view of high-speed processing and ease in using updated map data, optimum update-processing may differ for every map data. That is, application of similar map data processing may result in significant difference in processing speeds or ease in using map data depending on the type of map data. However, the difference in the nature of respective map data has not conventionally been taken into consideration. As a result, ease in using updated map data may be damaged through application of inappropriate processing.

SUMMARY OF THE INVENTION

The present invention has been conceived to overcome the above problems and aims to provide a map data processing apparatus and method for optimizing an update process through employment of a process most suitable for each type of map data.

In order to achieve the above object, according to a first aspect of the present invention, a differential data is used and stored in a storage means in different methods determined so as to accord each type of map data. According to a second aspect, whether or not to use differential data or general data is selected. According to a third aspect, combination of the first and second aspects will result in more favorable updating processing.

(1) According to the first aspect of the present invention, there is provided a map data processing apparatus comprising map data storage section for storing total map data comprising map data of a number of types, input means for inputting differential data with respect to map data of at least one type, in which differential data indicates difference between the latest map data and corresponding map data stored in the map data storage means, and updating means for updating map data stored in the map data storage means using the differential data.

The updating means has a general processing means and a restructure processing means. The general processing means stores differential data separately from extant map data in the map data storing means. The restructure processing means reads map data from the map data storing means, combines the read data and the differential data to thereby restructure map data, and stores restructured map data in the map data storage means. Restructured map data contains the last data and is still usable in the same method as with the map data before updating.

According to the present invention, either general processing means or restructure processing means is selectable in an updating process using differential data. General processing means would complete updating processing easily in a short time, though it would result In separately stored map data. Therefore, data to be preferably processed through general processing are those which can be easily processed despite separately filed differential data and pre-updating map data. Specifically, drawing data for navigation is preferably processed through general processing.

On the other hand, updating processing through restructure processing is more complicated and takes a longer time than through general processing. However, it ensures ease in using data as updated data can be used similarly before the updating process. Therefore, data to be preferably processed through restructure processing are those which cannot be easily used when differential data and map data before updating are separately filed. Route calculation data for navigation is an example of such data.

As described above, according to the present invention, positive employment of general processing can increase the update-processing speed, while employment of restructure processing if necessary can ensure ease in using updated data. In short, it is possible to achieve a high-speed updating while ensuring ease of map data use.

Preferably, differential data is obtained using a communication means, which may include radio or cable means. A communication device dedicated to data communication, a telephone capable of data communication, or a receiver capable of receiving transmitted data via broadcasting, may be used. Also, data communication may be performed with a connected computer.

In this invention, it is preferable to predetermine whether general processing or restructure processing is used according to the type of map data, though the present invention is not limited to this structure. Map data of the same type may be processed by either a general processing means or a restructure processing means depending on the status where data is stored in the storage means. The user may instruct which means to use. This is similarly applicable to the following second aspect.

(2) According to a second aspect of the present invention, there is provided a map data processing system for updating map data held by an on-vehicle terminal device, using latest map data transmitted from an information center to the on-vehicle terminal device. The information center comprises a selection means for selecting, with respect to each map data of a number of types consisting total map data, either differential data transmission or full data transmission, the differential data indicative of difference between latest map data and corresponding map data held by the on-vehicle terminal device, the full data being whole latest data. The on-vehicle terminal device comprises map data storage means for storing map data and updating means for updating the map data stored in said map data storage means, using the differential data or full data transmitted from the information center. The updating means has full data updating means for replacing map data corresponding to the full data, stored in said map storage means with the full data, and differential data updating means for performing update processing using said the differential data.

According to this aspect, whether to transmit differential data or full data is selected according to the type of map data. Differential data is preferable for reduction of a communication time and time to write data into the storage means. However, transmission of differential data may resultantly complicate subsequent processes for storing or utilizing data on the vehicle side. With respect to such data, full data is transmitted. For example, sales outlet information may be transmitted in the form of full data because such data may be updated at a relatively high frequency, and successive transmission of differential data may complicate subsequent data processing on the vehicle side. On the other hand, updating frequency is low with drawing data, and thus differential data may not complicate subsequent processing. Rather, differential data is preferable in that it can reduce transmitting data volume of drawing data which generally has an ample data volume.

As described above, according to the present invention, positive employment of differential data processing can increase the updating processing speed, while employment of full data processing when necessary can ensure ease in using updated data. In short, it is possible to achieve a high-speed updating while ensuring ease in using map data.

(3) Preferably, the differential data updating means according to the second aspect has a general processing means and a restructure processing means according to the first aspect. A general processing means and a restructure processing means are selectable based on the type of map data corresponding to the differential data sent by the information center. With this arrangement, in addition to preferable employment of either full or differential data for data transmission, general and restructure processing Is appropriately selected in an update process using differential data, which will contribute to optimizing the update process.

BRIEF DESCRIPTION OF THE DRAWINGS

The above and other objects, features, and advantages, will become further apparent from the following description of the preferred embodiment taken in conjunction with the accompanying drawings wherein:

FIG. 9 is a diagram showing the content of a management file In the map data base storage section.

DESCRIPTION OF THE PREFERRED EMBODIMENT

A preferred embodiment of the present invention will next be described with reference to the accompanying drawings.

Figure 1:
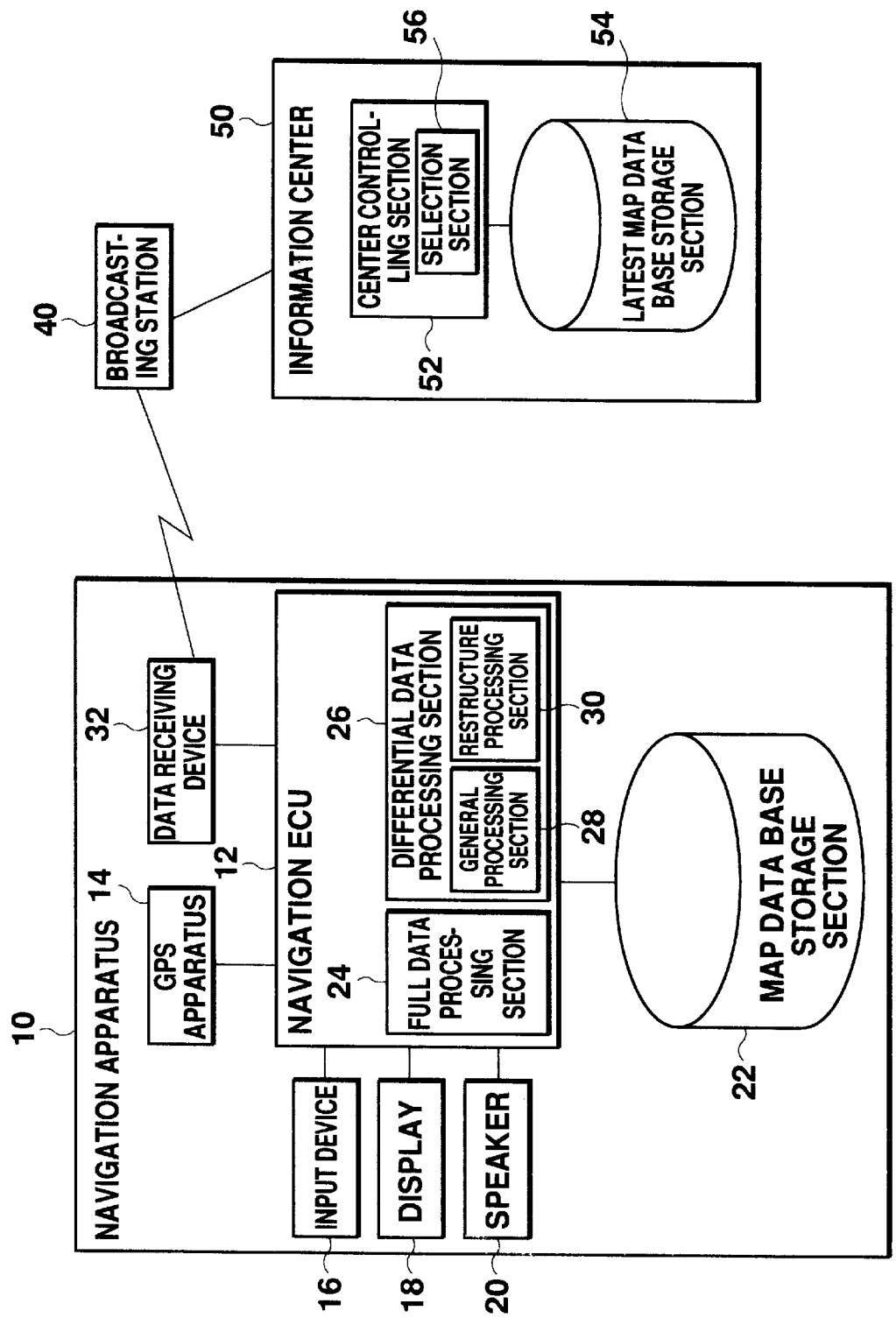
FIG. 1 is a block diagram showing a complete structure of a preferred embodiment of the present invention.

Referring to FIG. 1, which is a block diagram showing a complete structure of this embodiment, a map data processing apparatus of this invention is integrally formed on a vehicle-use navigation apparatus 10 mounted on a vehicle. The navigation apparatus 10 and an information center 50 together constitute a map data processing system of this invention.

The navigation apparatus 10 has a navigation ECU 12 which is responsible for comprehensive control over the apparatus 10. The navigation ECU 12 is connected to a GPS (global positioning system) apparatus 14 for detecting a present position based on electric waves transmitted from a man-made satellite to transmit the positional information to the navigation ECU 12. The navigation ECU 12 is further connected to an input device through which a user inputs various information, such as destination information. The navigation ECU 12 is still further connected to an output means, such as a display 18 and a speaker 20. The display 18 shows a map for route guidance, while the speaker 20 outputs audio guidance, if necessity.

The navigation ECU 12 is also connected to a map data base storage section 22 for storing map data for use in various navigation-related processes. The storage section 22 is a data readable/writable memory device. For example, a flash RAM or a hard disk device may constitute a preferable storing means. In this embodiment, the storage section 22 is a hard disk device.

Figure 2:
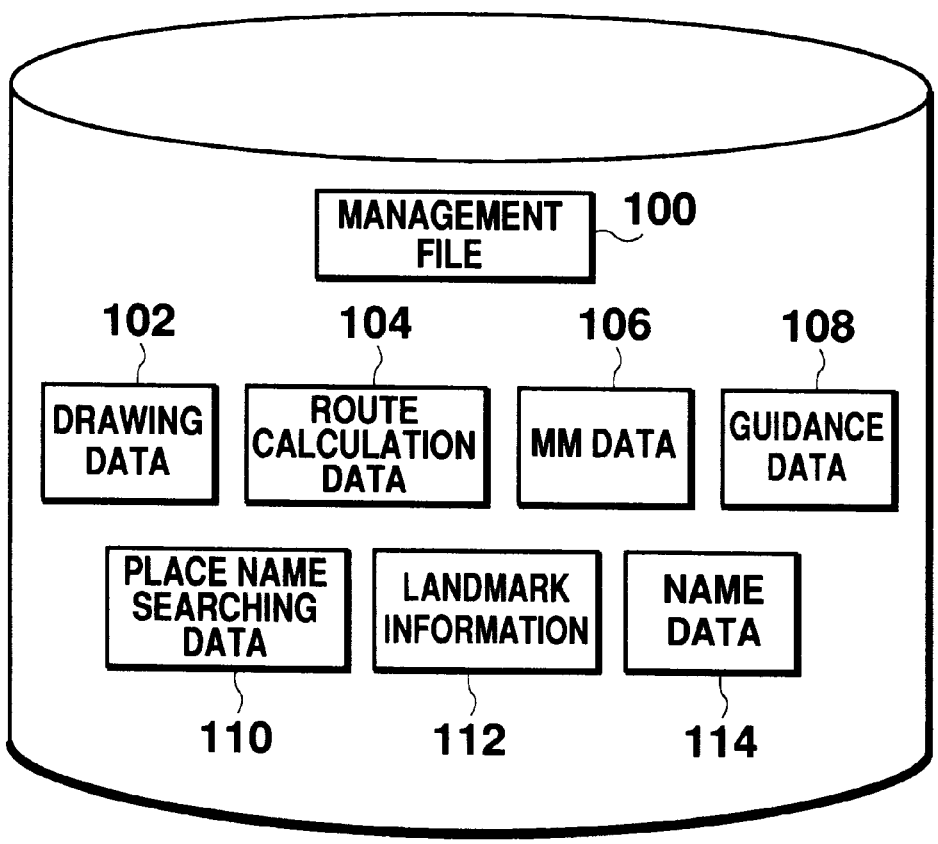
FIG. 2 is a diagram showing map data of a number of types stored in a map data base storage section of a navigation apparatus.

Referring to FIG. 2, showing the total map data stored in the map data base storage section 22, the total map data comprises map data of a number of types 102 to 114, each in the form of a file, with different purposes and embodiments for use. A management file 100 has information regarding portions in the storage section 22 where respective map data is stored.

The navigation ECU 12 performs various navigation-related processes using map data stored in the storage section 22. Drawing map data 102 is used to draw a map indicative of the shape of roads or geographic shapes. Image data of a drawn map is outputted to the display 18 for display. Route calculation data 104 is used to search an optimum route from the start point to the destination. A known Dijkstra method may be used for route calculation. MM (map matching) data 106 is used in a map matching process for correcting a present position detected by the GPS apparatus 14. Guidance data 108 has various information (such as a gas station as a mark for a crossing) usable in route guidance. By using the information, route guidance, such as, direction changing, is made. Place name searching data 110 is used to set a destination. A screen image for searching is shown in the display 18 so that the user operates the input device 16 while looking at the displayed image. Landmark information 112 concerns sales outlets, presenting names, addresses, business hours, and business classifications of the sales outlets. The landmark information 112 is automatically outputted via the display 18 or the speaker 20 according to a user's instruction. Name data 114 relates to the names of roads, and is shown as superimposed on a map in the display 18.

Referring again to FIG. 1, the navigation ECU 12 is further connected to a data receiving device 32 for receiving the latest map data transmitted from the information center 50 carried by broadcasting waves via a broadcasting station 40, to forward to the navigation ECU 12.

The information center 50 has a center controlling section 52 which is responsible for comprehensive control over the center 50. The center controlling section 52 is connected to a latest map data base storage section 54. The storage section 54 stores map data in the same format as on the vehicles side (see FIG. 2). The center 50 externally receives the latest information in succession, so that map data in the storage section 54 is updated based on the supplied information. For example, when a new road is built, drawing data and route calculation data are updated. Also, when the name, address, business hour, or business classification of a sales outlet is changed, landmark information is updated. That is, the storage section 54 always stores the latest map data.

The center controlling section 52 retrieves the latest map data from the latest map data base storage section 54, and sends the data to the broadcasting station 40. Received the data, the station 40 broadcasts the data carried by broadcasting electric waves. The broadcast latest map data is received by the data receiving device 32, and forwarded to the navigation ECU 12. Using the received latest map data, the navigation ECU 12 updates the map data stored in the map data base storage section 22. The navigation ECU 12 has a full data processing section 24 and a differential data processing section 26 for controlling an update process. The differential data processing section 26 has a general processing section 28 and a restructure processing section 30.

Next, a map data updating process in this embodiment will be described in detail.

Map data stored in the map data base storage section 22 of the navigation apparatus 10 is completely updated annually at a predetermined timing. For annual updating, a computer device is directly connected to the navigation apparatus 10 so that the whole content of the hard disk is updated. During a period after the complete map data updating and before the next one, map data is updated using data communication. This preferred embodiment is characterized by the fact that map data is updated in different updating processes determined depending on the type of the data. In the following, updating processes with respect to landmark information 112, drawing data 102, and route calculation data 104 will be separately described with reference to FIG. 3.

Updating of Landmark Information

Landmark information includes information concerning sales outlets or the like. Every time the names, addresses, business hours, and business classifications of sales outlets are changed, the information center 50 obtains new information. As information regarding sales outlets is frequently changed, landmark information may be changed with high frequency. In a case in which landmark information is transmitted in the form of differential data (described later) from the information center to a vehicle, differential data may be frequently transmitted, and sufficient differential data must be processed in order to present landmark information to a user on the vehicle side, which may complicate the process taking place on the vehicle side. Therefore, as to landmark information, the latest map data is transmitted intact, rather in the form of differential data. This latest map data is referred to as "ull data"

In the information center 50, the center controlling section 52 retrieves landmark information from the latest map data base storage section 54, and sends it to the broadcasting station 40. Selection and determination as to whether or not landmark information is sent in the form of full data is made by the selecting section 56 of the center controlling section 56. Also, landmark information may be divided into a number of portions before transmission, based on, for example, areas or contents of the information so that the transmitting data volume is kept within a predetermined value. Note that map data of other types (described later) may also be similarly divided.

Figure 3:
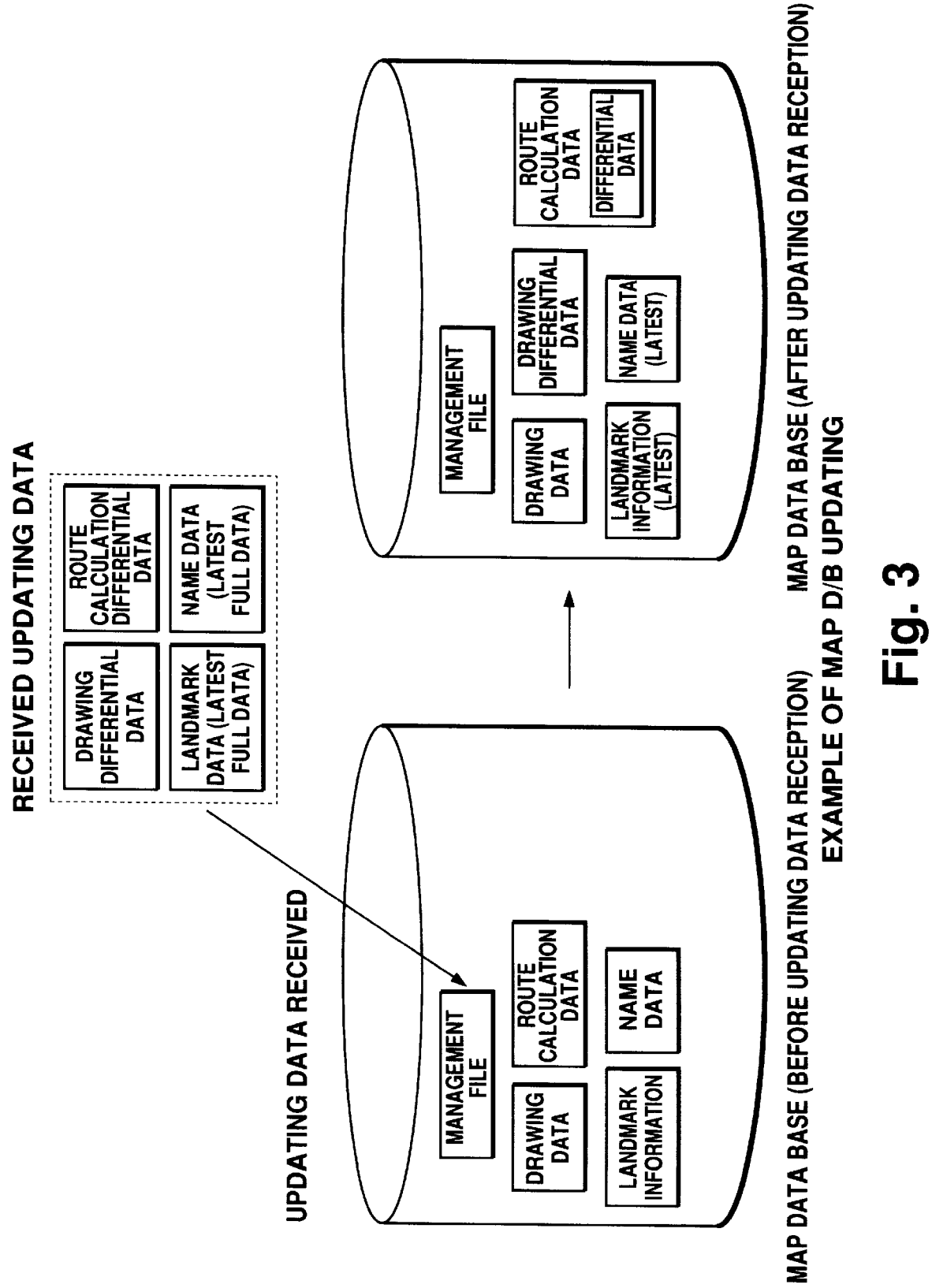
FIG. 3 is a diagram illustrating update processes different from each type of map data.

Referring to FIG. 3, the data receiving device 32 on the vehicle side receives full data of landmark information. The received data is forwarded to the navigation ECU 12, so that the full data processing section 24 writes the received latest landmark information over the corresponding landmark information stored in the storage section 22 to thereby update the landmark information. With this overwriting, the latest landmark information is stored in the storage section 22 after updating, as shown in the right lower part of FIG. 3. The latest landmark information Is thereinafter used for navigation.

Name data is also to be updated using full data, similar to the landmark information 112 (see FIG. 3), as is updated with relatively high frequency. Besides, preferably, guidance data 108 may also be similarly processed using full data.

Updating of Drawing Data

For drawing data, differential data, rather than full data, is used. Differential data of this embodiment is data having recently acquired information by an information center, such as, shapes of newly built roads or bridges. Stated differently, differential data indicates difference between the latest map data stored in the storage section 54 of the center and the drawing data stored in the storage section 22 on the vehicle side. In order to prepare differential data, the latest part may be extracted from the drawing data stored in the storage section 54. More preferably, differential data may be prepared beforehand to be kept in the storage section 54.

In actuality, as roads or bridges are not often newly built, updating frequency may be low with drawing data. Therefore, the use of differential data for updating drawing map data may not cause a problem as is described above with landmark data, that is, too much differential data must be dealt with. Rather, the use of differential data is beneficial in that it can reduce a transmission time which would be long if the whole drawing data having a large volume was transmitted. Therefore, drawing data is transmitted in the form of differential data from the information center 50 to a vehicle. Selection and determination as to whether or not drawing data is sent in the form of differential data is made by the selecting section 56 of the center controlling section 52.

Figure 4:
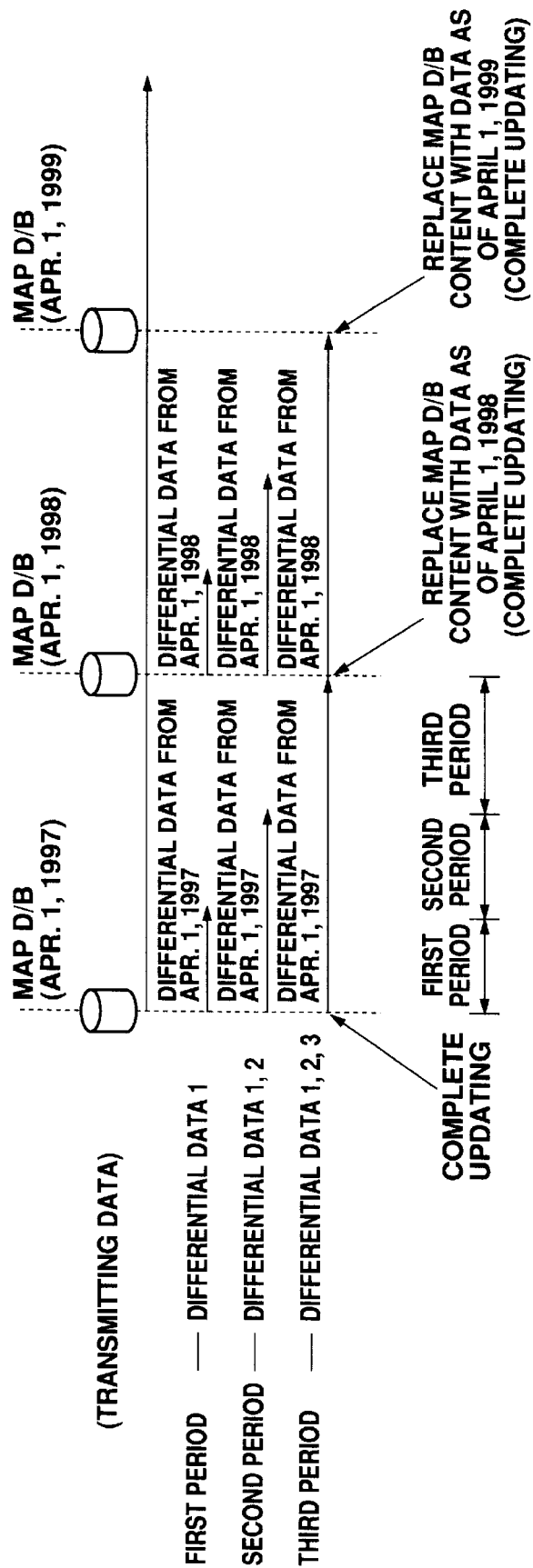
FIG. 4 is a diagram for explaining transmission of differential data from an information center to a vehicle.

In the example shown in FIG. 4, map data in the storage section 22 on the vehicle side is completely updated every year on April. 1. During the first period after the complete updating, differential data 1 is transmitted from the broadcasting station 40, in which the differential data 1 indicates information acquired during the first period. That is, the differential data 1 indicates difference between the latest drawing data and the drawing data as of the last complete updating.

During the second period following the first period, differential data 2 is prepared in the information center. Differential data 2 indicates newly acquired information during the second period. During the second period, differential data 1 and 2 are both transmitted from the information center. In other words, not only differential data 2 but also differential data 1 are supplied so that a user who bought a navigation apparatus 10 of this embodiment during the second period can also access to the differential data 1 pertaining to the first period. Similarly, during the third period, differential data 1, 2, and 3 are transmitted to the vehicle.

As shown in the drawing, the period from one complete data updating to the next one is divided into three parts. Alternatively, the period may preferably be divided into four or more parts. The larger number of parts the period is divided into, the newer information a vehicle can receive on a real time basis.

As described above, differential data of drawing data is transmitted from the information center 50 to the broadcasting station 40, so that the station 40 broadcasts the received information as carried by broadcasting electric waves. The broadcast differential data is received by the data receiving device 32, and forwarded to the navigation ECU 12. The ECU 12 updates the map data stored in the map data base storage section 22, using the supplied differential data.

In the above operation, general processing is given to the differential data of drawing data, different from route calculation data (described later). That is, the navigation ECU 12 has a differential data processing section 26 for map data updating using differential data. The differential data processing section 26 in turn has a general processing section 28 and a restructure processing section 30. Differential data of drawing data is processed by the former, or the general processing section 28.

Referring again to FIG. 3, the differential data of drawing data which was transmitted from the information center 50 is shown in the upper part of the drawing, while the map data currently stored in the storage section 22, which was written at the previous complete updating, is shown in the lower part thereof. The general processing section 28 writes the received differential data into the storage section 22 so that the differential data is stored therein separately from the extant drawing data. As a result, files for extant drawing data and for differential data exist separately after updating in the storage section 22, as shown in the lower right part the drawing. As described above, general processing results in drawing data stored in a number of divided groups.

Next, the reason for differential data of drawing data being subjected to general processing in this embodiment will be described. (1) General processing can easily take place in a short time with writing of differential data into the storage section 22 occupying the majority part of the processing. (2) separately stored files of extant drawing data and of differential data will not adversely affect the ease in conducting a drawing process using the data.

Figure 5:
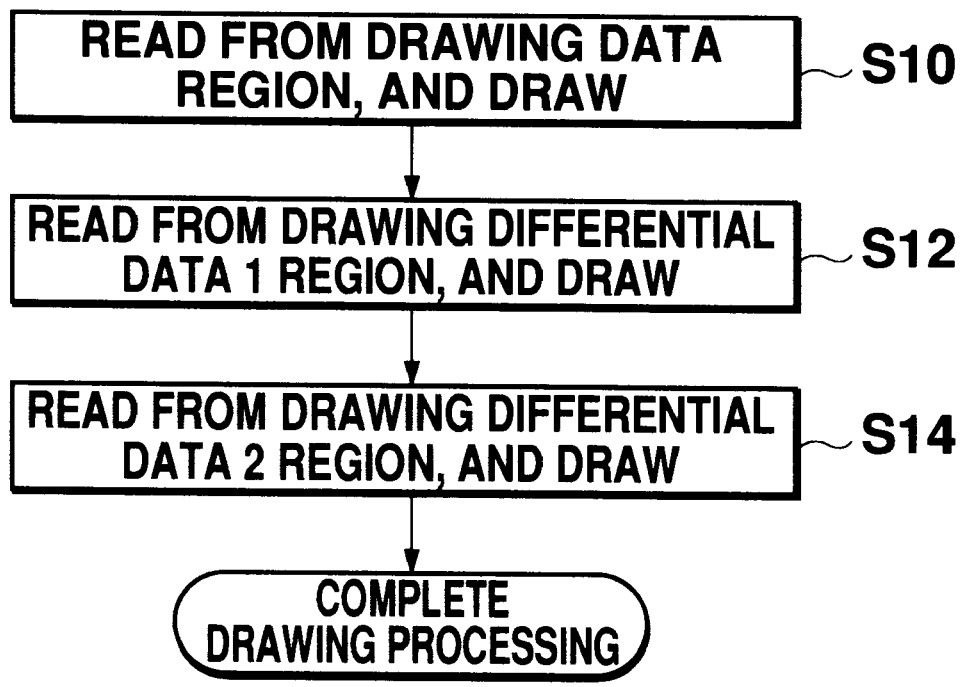
FIG. 5 is a flowchart of a process for drawing a map using drawing data and differential data thereof.

The above reason (2) will next be described with reference to FIG. 5, which is a flowchart of a process followed by the navigation ECU 12 to draw a map using drawing data and differential data. In this example, the storage section 22 currently stores drawing data, which is basic data, and differential data 1 and 2. As described referring to FIG. 4, differential data 2 was acquired after differential data 1, and contains new information which is not included in the differential data 1.

In a drawing process, the navigation ECU 12 initially accesses the basic drawing data file so as to carry out a drawing process using the data (S10). Then, the navigation ECU 12 accesses the differential data 1 file so that the shape of roads described in the data 1 is displayed as superimposed on the map drawn at S10 (S12). Subsequently, the navigation ECU 12 accesses the differential data 2 file so that the shape of roads described in the differential data 2 is displayed as superimposed on the map drawn at S10 and S12 (S14). After the drawing process is completed as described above, image data of the drawn map is sent to the display 18 to be displayed. When following the above procedure, a drawing process can be easily carried out, avoiding complexity, even using separately filed drawing and differential data.

As described above, when drawing data is updated through general processing, map data can be updated simply and easily while ensuring ease in performing a subsequent drawing process using the updated data. For the same reason described above, preferably, MM (map matching) data may be similarly processed, i.e., through general processing using differential data.

Updating of Route Calculation Data

Differential data is used when updating route calculation data. Updating frequency with route calculation data may be low, similar to drawing data. Therefore, the use of differential data for updating may reduce the transmitting data volume between the information center and a vehicle. Data transmission is made using the same method as is used with drawing data. Selection and determination as to whether or not route calculation data is sent in the form of differential data, is made by the selecting section 56 of the center controlling section 52.

On the vehicle side, the data receiving device 32 receives the transmitted differential data of route calculation data, and forwards the data to the navigation ECU 12. Using the supplied differential data, the ECU 12 updates the map data stored in the map data base storage section 22. Here, for updating, restructure processing is employed to the differential data of route calculation data by the restructure processing section 30 of the navigation ECU 12.

Referring again to FIG. 3, the differential data of route calculation data which was transmitted from the information center 50 is shown in the upper part of FIG. 3, while the route calculation data currently stored in the storage section 22, which was written at the previous complete updating, is shown in the lower part thereof. The restructure processing section 30 reads the extant route calculation data from the storage section 22 to combine with the newly supplied differential data to thereby restructure the route calculation data. The restructured route calculation data can thereafter be used for route guidance using the same method as is used with the route calculation data before restructure. The restructured data has information regarding, for example, the latest shapes of roads. In other words, the data is equivalent, in terms of available information, to the latest data held in the information center 50. Restructured data is written into the storage section 22, which is shown in the lower right part of the drawing.

Figure 6:
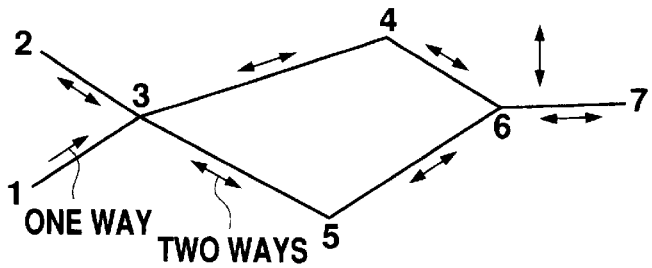
FIG. 6 is a diagram illustrating a restructure process using route calculation data and differential data thereof.
Figure 6:
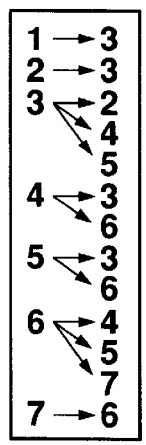
Figure 6:
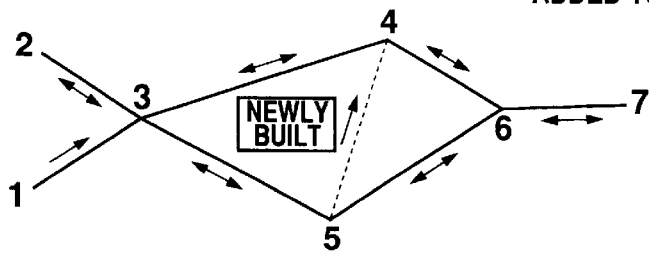
Figure 6:
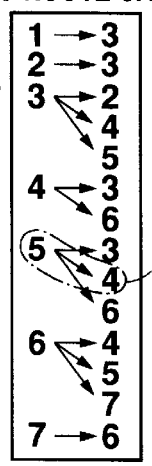

Referring to FIG. 6, a specific example of restructuring route calculation data will be described. In this embodiment, route calculation data is conventional link data, and numerous nodes are set on a map with link data representing connection among the nodes. In the left half of FIG. 6, link data is shown in a map-like form, while, in the right half, connection among nodes is shown.

Referring to the upper part of the drawing, showing route calculation data before updating, take node 5 for an example. The links connecting nodes 5 and 3, and nodes 5 and 6 represent two-way roads. Therefore, node 5 is connected to both nodes 3 and 6 (it is possible to reach both nodes 3 and 6 from node 5).

In an example in which a one-way road is newly build from node 5 to node 4, referring to the lower part of FIG. 6 showing restructured route calculation data, a vehicle acquires differential data indicative of the newly built one-way road. Next, link data before updating is read to be given the data indicative of the newly build road, as represented by a dot line in the drawing. Moreover, as shown by the one-dot chain line m in the lower right part of FIG. 6, nodes 4 and 5 are newly connected to each other. Restructured data is written into the storage section 22.

In the following, the reason why differential data of route calculation data is subjected to restructure processing in this embodiment will be described. Providing that general processing is applied to route calculation data, the data could be updated more easily at a higher speed. However, route calculation data would resultantly be stored as divided in a number of groups. For example, referring to FIG. 6, differential data indicative of the newly build one-way road (link 5→4) and other link data would be stored in different files. This would complicate a subsequent route searching process, and resultantly reduce the calculation speed. Under the current circumstance where an increase of a route calculation speed is desired, this is not preferable. Thus, restructure processing is applied instead to route calculation data, as described above. With this arrangement, it is possible to calculate routes using the same manner before and after the updating. In other words, consistent ease in using route calculation data for route calculation can be maintained before and after updating.

Preferably, place name searching data is similarly processed as above, i.e., through restructure processing, for the same reason described with route calculation data.

Figure 7:
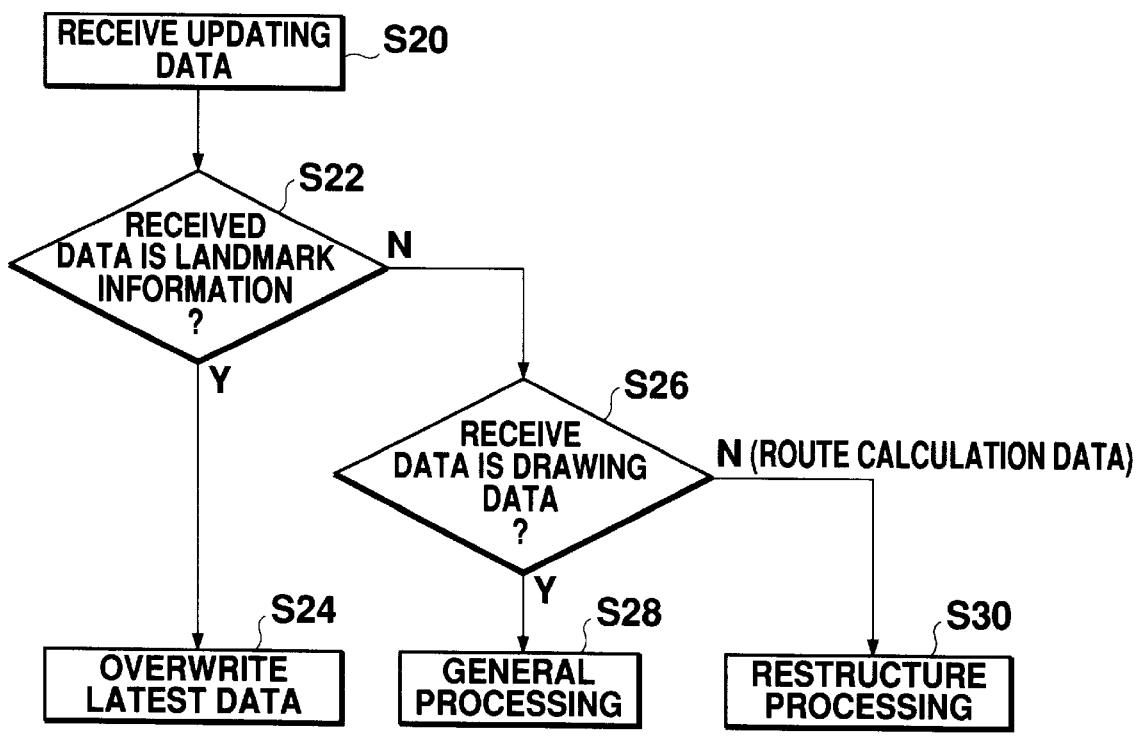
FIG. 7 is a schematic flowchart of a map data update process performed on a vehicle side.

Referring to FIG. 7, showing the flowchart of a complete map data updating process taken place on the vehicle side, it is known from the drawing that different update processes are performed depending on the type of map data, such as landmark information, drawing data, and route calculation data.

In the drawing, the navigation device 10 receives updating data (landmark information, drawing data, route calculation data) sent by the information center (S20). The navigation ECU 12 determines whether or not the received data is landmark information (S22). Because of the high updating frequency, as described earlier, landmark information must have been sent in the form of full data. In order to update landmark information, the older landmark information is overwritten by the newer information.

If the received data is not landmark information, i.e., "NO" at S22, whether or not received data is drawing data is judged at S26. Because of the low updating frequency and an advantage of significant reduction of a transmission time, as described earlier, drawing data must have been sent in the form of differential data. With respect to the differential data of drawing data, the general processing section 28 carries out general processing (S28). With this arrangement, an updating process can be performed simply in a short time. Even if the drawing data is caused to be stored separately in a number of groups as a result of general processing, that will not adversely affect the ease with which a drawing process is carried out, as described above.

Also, if the received data is not drawing data, i.e., "No" at S26, the received data must be route calculation data. Route calculation data is sent in the form of differential data, similar to drawing data. With respect to the differential data of route calculation data, the restructure processing section 30 carries out restructure processing (S30). In restructure processing, the differential data is combined with the extant route calculation data so that a route calculation process is prevented from being complicated.

Figure 8:
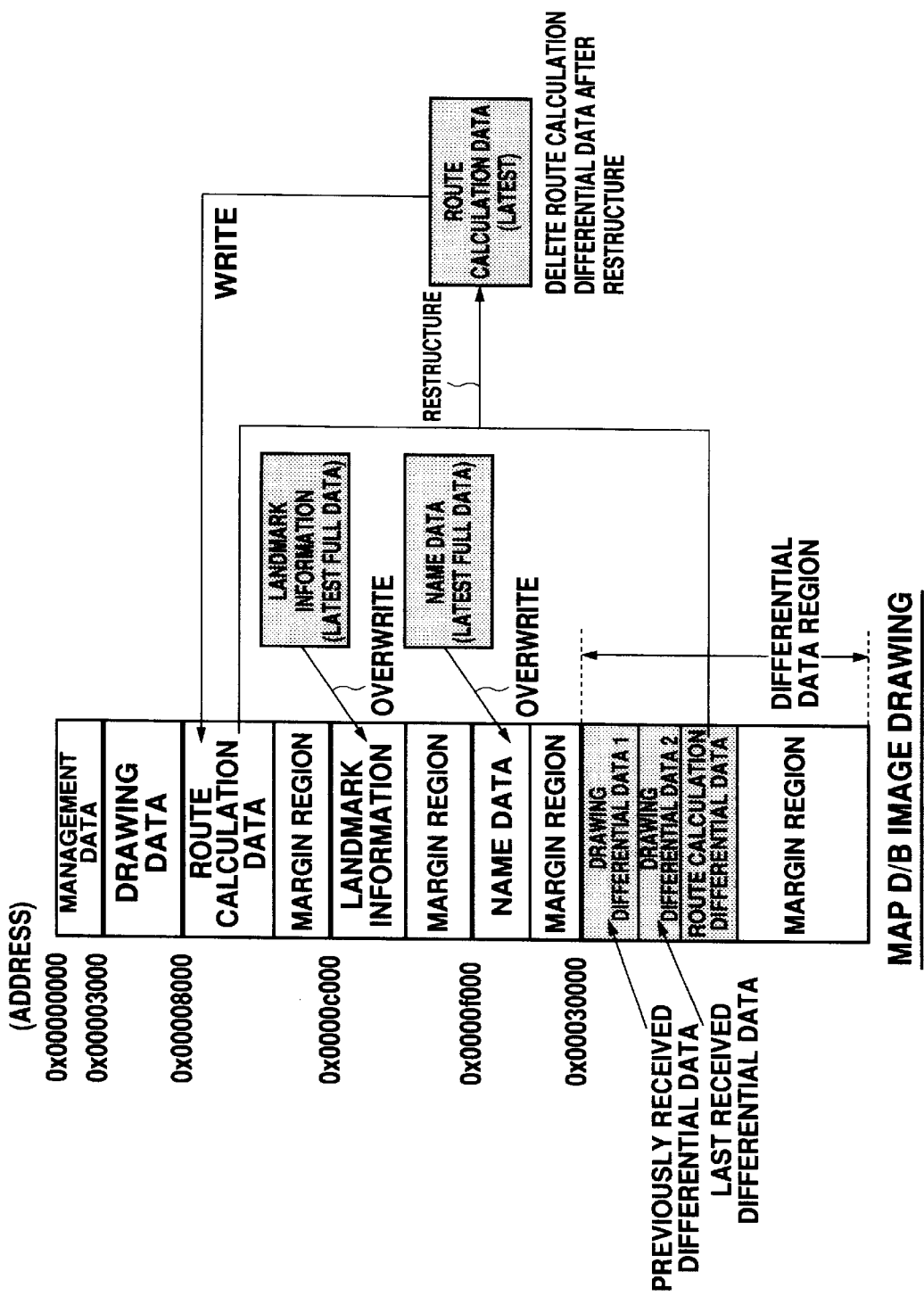
FIG. 8 is a diagram showing data storage regions in the map data base storage section in the navigation apparatus.

Next, referring to FIG. 8, showing a data storage region in the map data base storage section 22 of the navigation apparatus 10, drawing data, route calculation data, landmark information, place name data are stored in the form of a file in respectively assigned regions. The storage section 22 also has a differential data region for storing differential data sent from the information center. Management data, as shown in FIG. 9, manages start address information of respective regions storing the above data files.

When the vehicle receives updating data for landmark information, the received data is written over the extant landmark information. This is also the case with place name data.

Drawing data is sent in the form of differential data. The differential data is written into a differential data region, shown in the lower part of FIG. 8. That is, the differential data region, which has already been loaded with previously acquired differential data 1, additionally stores newly acquired differential data 2. The differential data is stored as separated from the drawing data shown in the upper part of FIG. 8 as a result of general processing applied to the drawing data.

Similarly, route calculation data is sent in the form of differential data, which is temporality written into the differential data region. Then, the differential data and the extant route calculation data are read and combined to thereby prepare restructured route calculation data. The restructured route calculation data is written over the route calculation data before updating. The differential data having been used for restructuring is then deleted from the differential data region.

Note that the data region for route calculation data contains a margin region in expectation of an increase of a data volume due to restructure. Data regions for landmark information and name place data also contain a margin region to get ready for increased data. On the other hand, a data region for drawing data does not contain a margin region because updating data is written only into the differential data region without affecting the extant drawing data.

As described above, in this embodiment the information center selects a preferable data format, i.e., either full or differential data, for every transmitting data to a vehicle. Differential data is positively used for reduction of a data transmission time, while full data is used with respect to data or information which is not preferably transmitted in the form of differential data, such as landmark information. Moreover, either general or restructure processing is applied to an update process using differential data. General processing is positively used for simplification of update-processing. Restructure processing is used, if necessary, with respect to route calculation data, or the like, so as to ensure the ease with which updated data is used. According to this embodiment, an update process can be carried out easily at a higher speed while ensuring ease in using map data for navigation, or the like.

In a modification of the above embodiment, while the information center 50 sends updating data via a broadcasting station 40 to the navigation apparatus 10 in the above, the information center may carry out data communication with each of the respective vehicles. For individual communication, a radio or cabled communication apparatus (including a telephone) may be used. For example, the navigation apparatus 10 sends, either automatically or upon the user's instruction, a request for updating data to the information center 50. The request includes version information of the map data held by the requesting vehicle. The version may be denoted by an updating date. The version may be different from every type of map data. Based on the version information, the information center 50 sends to the requesting vehicle necessary updating data in the form of either full or differential data. For sending full data, the whole of the latest data is supplied to the requesting vehicle when the vehicle is detected as not having the latest data. For sending differential data, data indicative of the difference between data with the informed version by the vehicle and the latest data, is supplied. Note that a satellite may be used for broadcasting and individual communication.

Also note that the present invention can be applied not only to a vehicle-use map data processing apparatus described above, but also to any desired apparatus which processes map data of a number of types.

What is claimed is:

1. A map data update apparatus, comprising:
   map data storage means for storing map data including a plurality of information types;
   input means for inputting differential data with respect to map data of at least one type, the differential data comprising a difference between latest map data and corresponding map data stored in said map data storage means; and
   updating means for updating the map data stored in said map data storage means using the differential data,
   said updating means including
      processing means for storing the differential data separately from extant map data in said map data storing means; and
      restructuring means for combining extant map data read from said map data storage means with the differential data, restructuring the map data, and storing restructured map data in said map data storage means.

2. A map data update apparatus according to claim 1, wherein said input means includes a data receiving device so as to input data externally supplied via data communication.

3. A map data update apparatus, comprising:
   map data storage means for storing total map data including map data of a number of types;
   input means for inputting differential data with respect to map data of at least one type, the differential data comprising a difference between latest map data and corresponding map data stored in said map data storage means; and
   updating means for updating the map data stored in said map data storage means using the differential data,
   said updating means including:
      processing means for storing the differential data separately from extant map data in said map data storing means; and
      restructuring means for combining extant map data read from said map data storage means with the differential data, restructuring the map data, and storing restructured map data in said map data storage means;
      wherein said updating means selects either said processing means or said restructuring means for updating according to a type of map data corresponding to the differential data.

4. A map data update apparatus according to claim 3, wherein said processing means updates drawing data for use in route guidance, and said restructuring means updates route calculation data for use in route guidance.

5. A map data update apparatus according to claim 4, wherein said processing means updates also map matching data of a GPS device for use in positional correction, and said restructuring means updates also place name searching data for use in setting a destination for route guidance.

6. A map data update apparatus, comprising:
   map data storage means for storing total map data including map data of a number of types having different purposes and embodiments for use;
   input means for inputting differential data with respect to map data of at least one type, the differential data comprising a difference between latest map data and corresponding map data stored in said map data storage means; and
   updating means for updating the map data stored in said map data storage means using the differential data,
   wherein said map data storage means stores map data of at least two types including drawing map data and route calculation data both for use in route guidance,
   said updating means includes processing means for storing, when supplied with differential data of drawing data, the differential data separately from extant map data in said map data storing means when said updating means is supplied with differential data comprising drawing data; and
   restructuring means for combining, when supplied with differential data of route calculation data, extant route calculation map data read from said map data storage means with the differential data, restructuring route calculation map data, and storing restructured route calculation map data in said map data storage means when said restructuring means is supplied with differential data comprising route calculation data.

7. A map data update method for updating map data stored in map data storage means using latest map data, comprising:
   an input step of inputting differential data indicative of a difference between latest map data and corresponding map data stored in said map data storage means;

a processing step of storing the differential data separately from extant map data in said map data storage means;

a restructuring step of reading extant map data from said map data storage means, combining the extant map data with the differential data to restructure the map data, and storing restructured map data in said map data storage means;

wherein either the processing step or the restructuring step is selected according to a type of map data subjected to updating.

8. A map data update method according to claim 7, wherein the map data includes drawing map data and route calculation map data both for use in route guidance, the drawing data being processed in the processing step, the route calculation map being processed in the restructuring step.

9. A map data update system for updating map data held by an on-vehicle terminal device, using the latest map data transmitted from an information center to said on-vehicle terminal device, comprising:

selection means mounted on said information center, for selecting transmission of either differential data or full data with respect to each of map data of a number of types which constitute total map data, the differential data comprising a difference between latest map data and corresponding map data held by said onvehicle terminal device, the full data comprising the entire latest data;

map data storage means mounted on said on-vehicle terminal device for storing map data; and updating means mounted on said on-vehicle terminal device, for updating the map data stored in said map data storage means, using the differential data or full data transmitted from the information center, said updating means having full data updating means for replacing map data stored in said map data storage means corresponding to the full data with the full data and differential data updating means for performing update processing using the differential data.

10. A map data update system according to claim 9, wherein said selection means selects transmission of either differential data or full data according to a type of map data.

11. A map data update system according to claim 10, wherein said differential data updating means has processing means for storing the differential data separately from extant map data in said map data storing means, and restructuring means for combining extant map data read from said map data storage means and the differential data to thereby restructure map data so that restructured map data is stored in said map data storage means, and selects either the processing means or the restructuring means according to a type of map data corresponding to the differential data transmitted from the information center.

12. A map data update system according to claim 11, wherein said selection means selects differential data with respect to drawing data and route calculation data for use in route guidance, and full data with respect to landmark information, which is map data including sales outlet information for use in route guidance.

13. A map data update system according to claim 12, wherein said full data updating means updates the landmark information, said processing means updates the drawing data, and said restructuring means updates the route calculation data.

14. A map data update apparatus for updating map data held using latest map data transmitted from an information center comprising:

map data storage means for storing total map data including map data of a number of types having different purpose and embodiments for use;

receiving means for receiving either differential data or full data from said information center according to types of map data, the differential data indicating difference between latest map data and map data stored on a vehicle side, the full data being equivalent to the latest map data; and updating means for updating the map data stored in said map data storage means using either the differential data or the full data.

* * * * *